United States Patent Office 2,822,280
Patented Feb. 4, 1958

2,822,280

CASEIN-CONTAINING LITHOGRAPH COATING

William H. Martin, Hiram Township, Portage County, Ohio, assignor to Harris-Seybold Company, Cleveland, Ohio, a corporation of Delaware No Drawing. Application August 3, 1953
Serial No. 372,203

10 Claims. (Cl. 106—146)

Casein has been used in lithograph coatings to quite an extent, but is handicapped by some unfavorable properties. I have now found, however, that it can be made into an excellent medium, with superior properties, by certain treatment as hereinafter described. Its adverse viscosity-increase with concentration can be eliminated, and its light sensitivity speed can be very greatly improved, and withal, a product capable of standing up in shelf storage now becomes available. Other objects and advantages of the invention will appear from the following description.

To the accomplishment of the foregoing and related ends, said invention, then, comprises the features hereinafter fully described and particularly pointed out in the claims, the following description setting forth in detail certain illustrative embodiments of the invention, these being indicative, however, of but a few of the various ways in which the principle of the invention may be employed.

I have found that if casein be treated with glyoxal, CHO.CHO, the time requirement in light exposure in preparing plates can be very greatly reduced. Considering that the output of a lithographic establishment is conditioned in part by the time required for exposure of each plate, it is readily apparent that a diminution in time for the individual plate will amount to a very material overall increase in the possible output. Furthermore, I have found that by reacting on casein in solution with dissolved albumen, there is a peculiar phenomenon, a precipitate being formed. This is quite unexpected, as there is not a prior reason for such a result. On discarding this precipitate, the remaining solution is found to differ from casein and from albumen in behavior in a lithographic coating. A peculiarity noted here is that in mixing solutions of albumen and casein these initially being very light in color, after the precipitation reaction has occurred the final clear solution is somewhat amber colored, and the viscosity relation is changed in a manner peculiar. For instance if 70 percent of a 4.5 Beaumé solution of albumen and 30 percent of a 4.5 Beaumé solution of casein be mixed the pH being in the range of about 8–10.3, as may be adjusted with ammonium hydroxide, prima facie it would be expected that the resultant viscosity of the clarified solution would average 23 centipoises. But actually, the viscosity turns out to be 5 centipoises. Similarly, again, if for instance 10 percent of a 4.5 Beaumé solution of albumen and 90 percent of a 4.5 Beaumé solution of casein be mixed, and with a pH in the range of about 8–10.3, the ultimately clarified solution would prima facie be expected to average a viscosity of 63 centipoises. But actually it is found to be 30 centipoises. Again, the tendency of compositions including casein to run up viscosity disproportionately rapidly as concentration is increased, is absent here, and compositions may be made up to provide particularly favorable working viscosities and with desirable concentrations. While solutions of the Beaumé strength above noted are illustrative, it will be understood of course that concentrations of casein and of albumen in ranges which permit manipulation of solutions, are in general applicable, and thus concentrations of solutions respectively may be 10 to 90 percent, dry weight on the albumen and on the casein; that is, if casein is 10 to 90 percent, albumen is complementally the amount to make up 100. It is particularly noticed that it is the water-soluble reaction product of albumen on casein which is used, and whether a true solution or a dispersion from a theoretical standpoint, is immaterial, the matter being from a practical standpoint a solution. What the reaction is between these complex protein molecules is not clear. It is quite surprising though that the water-soluble reaction product analyzes less alkaline earth compounds than does the precipitate component. In any event, the soluble reaction product provides the desired advantages in accordance with the present invention.

While various proportions of casein and albumen may be employed, the properties of the resultant solution after the precipitating reaction, are useful where the proportions are within the general range of about 29–95 parts of albumen, dry weight basis, casein making up the remainder, and a further peculiarity is that in the range around 30 parts of albumen to 70 parts of casein, and again in the range of about 70 parts of albumen to 30 of casein, especially favorable products are to be had.

In treating the casein with glyoxal, the casein is desirably 8 to 20 percent solution in water. And a desirable range of glyoxal addition here is 0.5 to 25 percent, on the dry weight of the casein. Using a 30 percent glyoxal commercial solution, .05 to .25 part may be applied per 1 part of the protein solid, and the pH may be adjusted to about 9.5.

With the casein solution or with the solution from the reaction of albumen and casein, there is incorporated a chromium compound providing hexavalent chromium, such as chromates, dichromates, etc., of alkali metals or ammonium. Such may be in amount of 15 to 40 percent based on the dry protein. Some latitude of choice is open here, with respect to slightly different results depending upon the particular salt employed. Thus, sodium compounds while quite close to the potassium compounds in general action, have some peculiarities and any of the alkali metal compounds will of course remain in the coating, but on the other hand, if an ammonium compound be employed it is ultimately fugitive from the coating. Casein-containing coating solutions treated with glyoxal remain clear, and the inclusion of albumen in the present relation does not lead to formation of "stringers" as customarily expected with albumen-containing coating solutions, and the modified casein is found to have outstanding stability against formation of deposits, and at the same time the viscosity of the casein is controlled to result in an easily workable or spreadable solution as applied to a lithographic plate.

As afore-noted, glyoxal is found to affect the light-sensitivity. It is not used in substitution of chromate, but in the complete composition there is an acceleration of light-action in exposure. A chemical mechanism which causes such unexpected acceleration is not understood, and I content myself with stating the facts.

In some instances where desired, a preservative against bacterial and mold development may be added, and for this I have found that silver nitrate in amount of about 0.2 percent is advantageous, and other preservatives can be used such as pyridyl mercuric acetate, chlorophenol, etc., 0.2 to 2.0% based on dry weight of coating.

As an example: Casein in 4.5 Bé. aqueous solution is treated with ammonium hydroxide to a pH of 8–10.3, and .01 part of 30 percent commercial glyoxal solution is added for each part by dry weight of the casein. To this is added one part of ammonium dichromate for 2 parts of the protein solid.

As another example: A 4.5 Bé. aqueous solution of albumen scale (the commercial albumen obtained from the shell drainings of eggs in egg-drying establishments and the like) is mixed with a 4.5 Bé. aqueous solution of a uniform commercial casein, e. g. Borden PV-401 in the ratio of 90 parts of casein solution to 10 parts of albumen solution. Each of the aforesaid solutions should have their pH adjusted to 8-10.3. The solution mixture is allowed to stand overnight, and a precipitate is formed, and on filtration, a clear amber solution is obtained. Ammonium dichromate is added in amount of 1 part to 2 parts of the protein solids.

As another example: With the reaction product solution as obtained in the next foregoing example above, there is incorporated glyoxal in proportion of 1 part of the commercial 30 percent solution to 99 parts of the albumen-casein solution. This may be used immediately, or it may be stocked for future use.

As another example: Following the procedure in the second example above, again 70 parts of albumen solution is mixed with 30 parts of casein, and the ammonium dichromate is incorporated, etc.

As another example: With a reaction product solution from 70 parts of albumen solution to 30 parts of casein solution, there is incorporated 1 part of ammonium dichromate and 1 part of 30 percent glyoxal commercial solution to 99 parts of the protein solids, and the solution is adjusted to 5.8 Bé., and by addition of ammonium hydroxide, the pH is adjusted to 9.5.

In similar manner, dissolved albumen may be reacted upon dissolved casein, using ratios of 50 parts of one solution to 50 parts of the other, or other desired ratios, and again the other materials may be incorporated individually or both.

Casein-coating thus glyoxal-treated, requires substantially only half the exposure-time in forming lithograph plates that casein not so treated requires.

Other modes of applying the principle of the invention may be employed, change being made as regards the details described, provided the features stated in any of the following claims or the equivalent of such be employed.

I therefore particularly point out and distinctly claim as my invention:

1. A lithographic coating composition consisting essentially of a water-soluble reaction product of dissolved albumen and dissolved casein in water, with elimination of precipitated matter, said reaction product being formed from a mixture consisting essentially of about 5 to 95 percent albumen and about 5 to 95 percent casein and having a pH of about 8.0 to 10.3.

2. A lithographic coating composition consisting essentially of a water-soluble reaction product of dissolved albumen and dissolved casein in water, with elimination of precipitated matter, said reaction product being formed from a mixture consisting essentially of about 5 to 95 percent albumen and about 5 to 95 percent casein and having a pH of about 8.0 to 10.3, and a sufficient amount of a chromium compound providing hexavalent chromium in water to provide light sensitivity.

3. A lithographic coating composition consisting essentially of a water-soluble reaction product of dissolved albumen and dissolved casein in water, with elimination of precipitated matter, said reaction product being formed from a mixture consisting essentially of about 5 to 95 percent albumen and about 5 to 95 percent casein and having a pH of about 8.0 to 10.3, and a chromium compound providing hexavalent chromium in water in an amount of 15 to 40 percent by weight of said reaction product.

4. A lithographic coating composition consisting essentially of a water-soluble reaction product of dissolved albumen and dissolved casein in water, with elimination of precipitated matter, said reaction product being formed from a mixture consisting essentially of about 5 to 95 percent albumen and about 5 to 95 percent casein and having a pH of about 8.0 to 10.3, and ammonium dichromate in sufficient quantity to provide light sensitivity.

5. A lithographic coating composition consisting essentially of a water-soluble reaction product of dissolved albumen and dissolved casein in water, with elimination of precipitated matter, said reaction product being formed from a mixture consisting essentially of 29 to 95 percent albumen and 5 to 71 percent casein and having a pH of about 8.0 to 10.3.

6. A lithographic coating composition consisting essentially of a water-soluble reaction product of dissolved albumen and dissolved casein in water, with elimination of precipitated matter, said reaction product being formed from a mixture consisting essentially of about 30 percent albumen and about 70 percent casein and having a pH of about 8.0 to 10.3.

7. A lithographic coating composition consisting essentially of a water-soluble reaction product of dissolved albumen and dissolved casein in water, with elimination of precipitated matter, said reaction product being formed from a mixture consisting essentially of about 70 percent albumen and about 30 percent casein and having a pH of about 8.0 to 10.3.

8. A method of preparing a lithographic coating solution comprising chemically reacting about 5 percent to 95 percent albumen with about 5 percent to 95 percent casein in an aqueous medium at a pH of about 8 to 10.3 and removing the precipitated matter, thereby providing a suitable solution for coating a lithographic plate.

9. A method of preparing a lithographic coating solution comprising chemically reacting about 5 percent to 95 percent of albumen with about 5 percent to 95 percent casein in an aqueous medium at a pH of about 8 to 10.3, removing the precipitated matter, and incorporating a sufficient amount of a chromium compound providing hexavalent chromium in water to impart light sensitivity, thereby providing a suitable solution for coating a lithographic plate.

10. A method of preparing a lithographic coating solution comprising chemically reacting about 29 percent to 95 percent albumen with about 5 percent to 71 percent casein in an aqueous medium at a pH of about 8 to 10.3, removing the precipitated matter, and incorporating a chromium compound providing hexavalent chromium in water in an amount of 15 percent to 40 percent of the resulting reaction product, thereby providing a suitable solution for coating a lithographic plate.

References Cited in the file of this patent

UNITED STATES PATENTS

| | | |
|---|---|---|
| 1,841,797 | Ernst et al. | Jan. 19, 1932 |
| 2,180,335 | Brunken | Nov. 21, 1939 |
| 2,624,672 | Frost | Jan. 6, 1953 |
| 2,663,639 | Wood et al. | Dec. 22, 1953 |